(12) United States Patent
Dahlberg et al.

(10) Patent No.: US 7,159,691 B2
(45) Date of Patent: Jan. 9, 2007

(54) CASING FOR LEAF BLOWER

(75) Inventors: Göran Dahlberg, Gränna (SE); Gustaf Döragrip, Jönköping (SE); Peter Gunnarsson, Gränna (SE); Marcus Kragner, Huskvarna (SE); Anna Sjögren, Jönköping (SE); Esbjörn Ollas, Huskvarna (SE)

(73) Assignee: Aktiebolaget Electrolux, Stockholm (SE)

( * ) Notice: Subject to any disclaimer, the term of this patent is extended or adjusted under 35 U.S.C. 154(b) by 472 days.

(21) Appl. No.: 10/141,302

(22) Filed: May 8, 2002

(65) Prior Publication Data

US 2002/0166194 A1 Nov. 14, 2002

(30) Foreign Application Priority Data

May 11, 2001 (SE) .................................... 0101666

(51) Int. Cl.
*A47B 81/06* (2006.01)
(52) U.S. Cl. ..................................................... 181/198
(58) Field of Classification Search .................. 15/326; 417/312; 181/231
See application file for complete search history.

(56) References Cited

U.S. PATENT DOCUMENTS

| 4,258,821 | A | * | 3/1981 | Wendt et al. ............... 181/202 |
| 4,892,413 | A | * | 1/1990 | Vats ........................... 366/349 |
| 5,011,058 | A | * | 4/1991 | Sapp et al. .................. 224/261 |
| 5,176,303 | A | * | 1/1993 | Franke ........................ 224/261 |
| 5,195,208 | A | * | 3/1993 | Yamami et al. ............... 15/326 |
| 5,432,306 | A | * | 7/1995 | Pfordresher ................. 181/198 |
| 5,657,917 | A | * | 8/1997 | Johnson et al. ............. 224/582 |
| RE37,081 | E | * | 3/2001 | Eriksen ..................... 15/327.5 |
| 6,575,695 | B1 | * | 6/2003 | Miyamoto ................... 415/119 |
| 6,644,004 | B1 | * | 11/2003 | Reimers et al. .............. 56/14.7 |
| 2001/0002501 | A1 | * | 6/2001 | Doragrip ..................... 15/344 |

* cited by examiner

*Primary Examiner*—Kimberly Lockett
(74) *Attorney, Agent, or Firm*—Pearne & Gordon LLP

(57) ABSTRACT

Conventional leaf blowers have a supporting frame to where the different components are attached. In order to reduce the noise from the tool and protect some of the components are they provided with covers. This makes the tool heavy and complicated for the operator to use. The claimed invention is a covering casing (10) that also is the supporting structure for the different components in the tool. The casing reduces the amount of noise spread from the tool and protects the components inside the casing (10).

8 Claims, 4 Drawing Sheets

CASING FOR LEAF BLOWER

BACKGROUND OF THE INVENTION

Combustion engine powered leaf blowers are used more and more for different kinds of work. The numbers of areas where leaf blowers are used is increasing and the leaf blowers are replacing traditional brooms. Leaf blowers are an effective and time saving tool for cleaning of large areas like, for example, parking places, pavements, lawns and footpaths.

Leaf blowers make it possible to clean large areas in an easy way. During cleaning of areas with conventional equipment, parked cars in a parking place will make it necessary to leave parts of the area uncleaned. If the same area is cleaned with a leaf blower, it is possible to blow away the rubbish underneath the parked cars, which will increase the efficiency, save time and improve the result.

Even though the leaf blower is an effective tool that helps the operator to clean large areas, the operator will work long shifts carrying the leaf blower on the back. Leaf blowers available on the market today are large and heavy, with the center of gravity of the tool placed at a long distance from the back of the operator. This will subject the operator to high loads when the leaf blower is carried on the back of the operator. This type of tool also generates a lot of noise, which will make it very tiring for the operator as well as for other persons located close to the tool.

A leaf blower comprises at least a fan with a fan wheel, an engine and a couple of other details that are necessary to make the leaf blower work properly. The leaf blowers that are designed to be carried on the operators back that are available on the market today is designed with the fan and the fan wheel closes to the operators back and secured to a supporting frame for example made of pipes or shaped like a plate. The straps for carrying the leaf blower are secured in the supporting frame. Air to the fan is sucked into an inlet placed on the side of the fan that is turned toward the back of the operator. There must, therefore, be a gap of about 5 to 10 centimeters between the back of the operator and the inlet to the fan to guarantee that enough air will reach the inlet. The engine is then placed on the fan wheel axle on the side of the fan wheel that is turned away from the back of the operator.

A leaf blower designed like this will have a center of gravity placed at a long distance from the back of the operator. The distance between the center of gravity of the tool and the back of the operator is very important since it is related to the load that the operator is subjected to, as well as how easy it is to handle the tool. This distance should be as short as possible in order to minimise the loads on the operator.

There are several different leaf blowers available on the market, but all of them have some sort of supporting fame. To this supporting frame, often made of pipes or plates, different components in the leaf blower are attached. Some of these components may be provided with a cover that protects the component or for reducing the noise that is discharged from the component. Drawbacks of these known solutions are that they are heavy, take a lot of space and are not considered to be effective in lowering the noise level around the tools. This type of leaf blower is illustrated in U.S. Pat. No. 5,195,208.

SUMMARY OF THE INVENTION

The known models of leaf blowers have several drawbacks. The design of leaf blowers must therefore be improved to reduce the load on the operator and the amount of noise that is discharged from the tool. The claimed invention reduces both the loads on the operator as well as the noise discharged from the tool.

The claimed invention solves the problems described above by using a casing that covers all components in the leaf blower's machinery. The casing is an effective insulation that reduces the noise that is discharged from the tool. The casing comprises to sections, a bottom section and a lid. In the claimed leaf blower, the supporting frame of pipes or plates is replaced by the casing, which is the supporting structure that the components are attached to instead of a supporting frame. This solution reduces the weight of the tool.

The casing is made of a material that is good for noise insulation, which considerably reduces the amount of noise in the environment of the tool.

The casing also works as a protective shell that surrounds all the components, protecting the components during careless treatment of the tool so that the tool will last longer. Consequently, the casing must be made of a material that can resist bumps and wear, that is effective for sound insulation and that can be formed into the desired shape. The casing is therefore preferably made of a plastic material and provided with a fastening means that secures the two sections of the casing together in a reliably way. The outside of the casing is smooth and plain in order to prevent the leaf blower from catching onto other things during use and transportation. The smooth and plain outside of the casing also reduces the risk that the operator will get caught on something when the leaf blower is carried on the back of the operator. All components related to the machinery of the leaf blower are secured to the bottom section of the casing as well as the straps that make it possible for the operator to carry the leaf blower. The bottom section is shaped to be as comfortable as possible for the operator to carry on the back.

The casing is shaped almost like a rucksack and has an handle top to facilitate the carrying, storing and transportation of the leaf blower when it is not placed on the back of the operator.

The casing must have a few openings to make the tool work properly. There is one air inlet for air to pass through the casing to the fan and the engine and one opening where the pipe from the fan outlet passes through the casing. The air inlet is placed in the lower part of the casing in order to minimise the possibility for the sound waves inside the casing to pass out from the casing through the air inlet. The gasoline tank is also placed in the lower part of the casing so that the tank will help generating a sound wave trap in the air inlet.

The exhaust gases from the engine can be lead out from the casing via the pipe from the fan outlet or another separate opening in the casing. This opening is then placed on the side of the casing facing away from the back of the operator and close to the muffler in order to minimise the distance between the muffler and the opening. This opening is also provided with a sound wave trap so that the sound waves are prevented from leaving the casing. The opening for the pipe from the fan outlet is placed so that the pipe leaves the either of the sides of the casing in a direction that makes the use of the tool comfortable for the operator. Therefore, the pipe will leave the casing on one of the sides and pointing downward toward one of the hands of the operator. Also, this opening is designed to stop as much noise as possible from leaving the casing, and the connection between the pipe and the softer pipe that the operator uses for cleaning is an effective damper of the noise generated from the engine and the fan. The casing can also be provided with an opening for ventilation of heated air from the inside of the casing. This opening is preferably placed in the top of the casing since the heated air will rise upward because of convection.

To further reduce the risk for transferring noise and vibrations from the components inside the casing to the operator and the environment, the components are attached to the casing via insulators for vibrations and sound. This improves the working conditions for the operator.

BRIEF SUMMARY OF THE DRAWINGS

One embodiment of the claimed invention is illustrated in FIGS. 1–5.

DETAILED DESCRIPTION OF AN EMBODIMENT OF THE INVENTION

Figure 1:
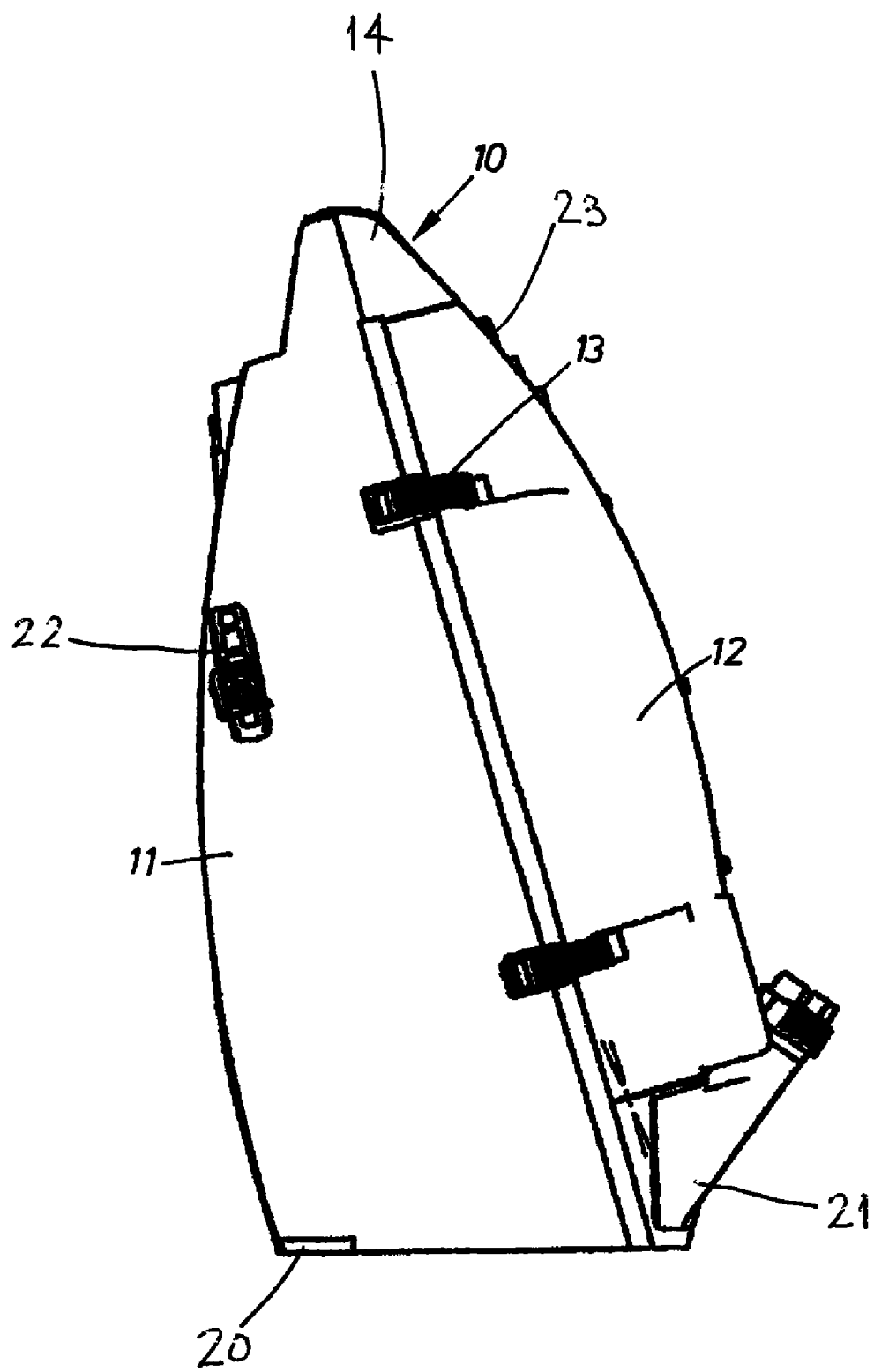
FIG. 1. Shows a side view of the casing.

FIG. 1 illustrates a casing 10 that is shaped almost like a mid-sized rucksack and covers the different components in the leaf blower's machinery, which include an engine and a fan. The casing 10 comprises two sections, one bottom section 11 and a lid 12. The two sections are secured to each other by fastening means 13 placed around the sides of the casing 10.

Figure 2:
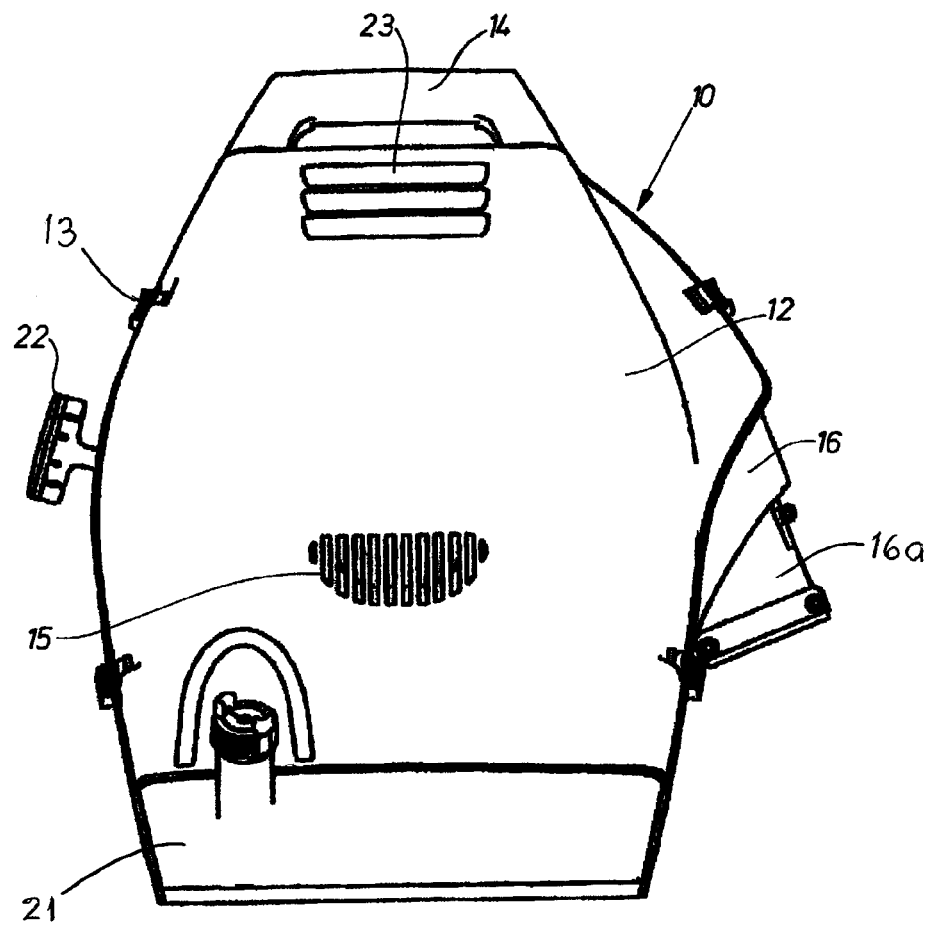
FIG. 2. Shows the side of the casing that is turned backward from the operator.

FIG. 2 illustrates the side of the casing 10 that is turned away from the back of the operator when the leaf blower is in its right position on the back of the operator. In order to facilitate transportation and lifting of the leaf blower, the casing is provided with a handle 14 in the top of the casing 10.

Figure 4:
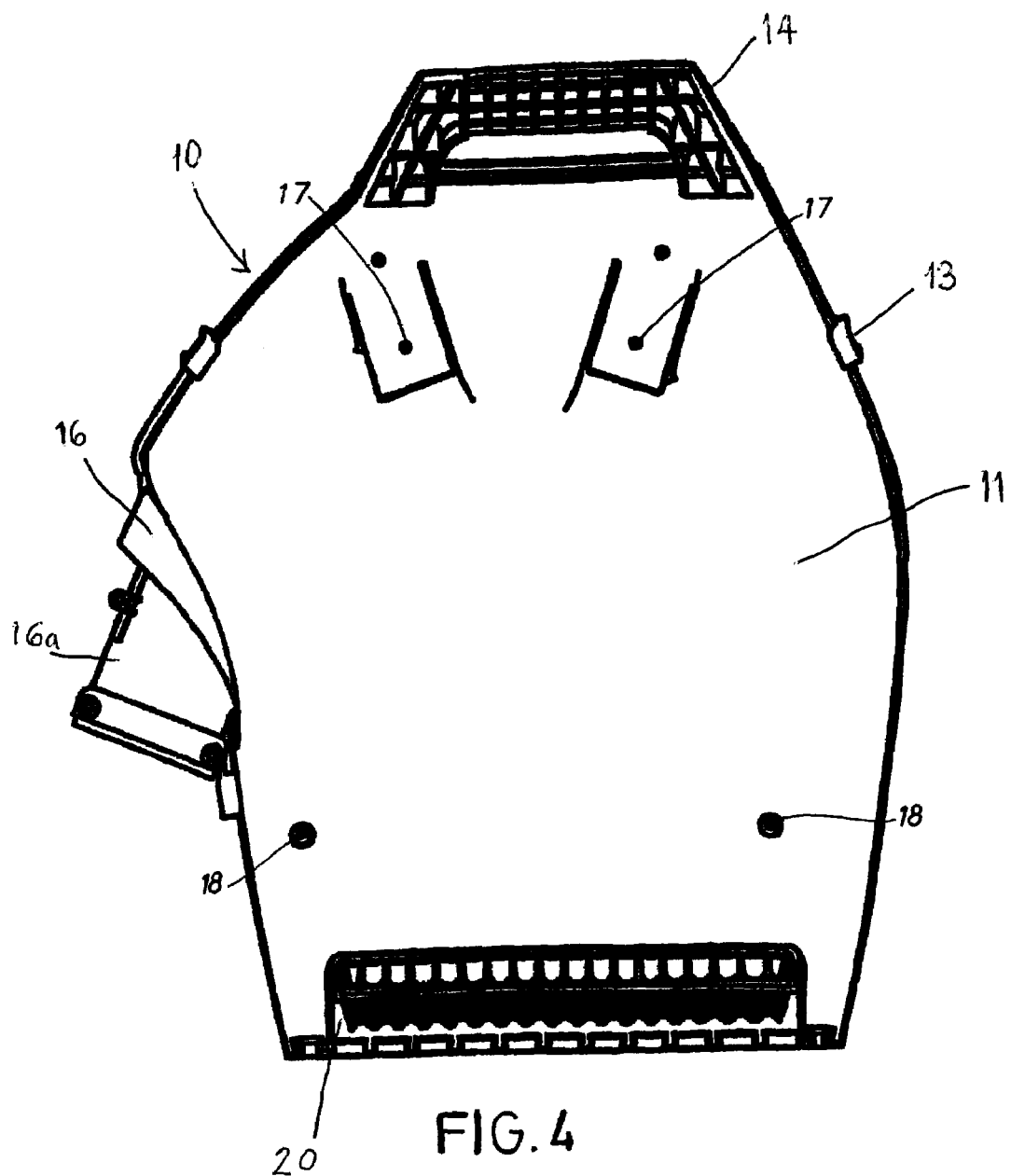
FIG. 4. Shows the side of the casing that faces the back of the operator.

Exhaust gases from the engine pass through the casing 10 via an exhaust opening 15 in the lid 12, which also includes a ventilation opening 23 for venting heated air from the inside of the casing 10. The bottom section 11 of the casing 10 includes an air inlet 20 (FIGS. 1 and 4) to provide air to the fan and the engine. The bottom section 11 of the casing 10 also includes a passage 16 where a pipe 16a from the fan inside the casing 10 is lead through the casing 10. The passage 16 is placed so that the operator will have a comfortable working position for the arm. On the opposite side of the passage 16, a starting rope and a starting handle 22 are provided for the engine that is inside the casing 10. The position of the starting handle 22 is chosen so that the operator can reach the starting handle 22 when the leaf blower is in the position on the back of the operator.

Figure 3:
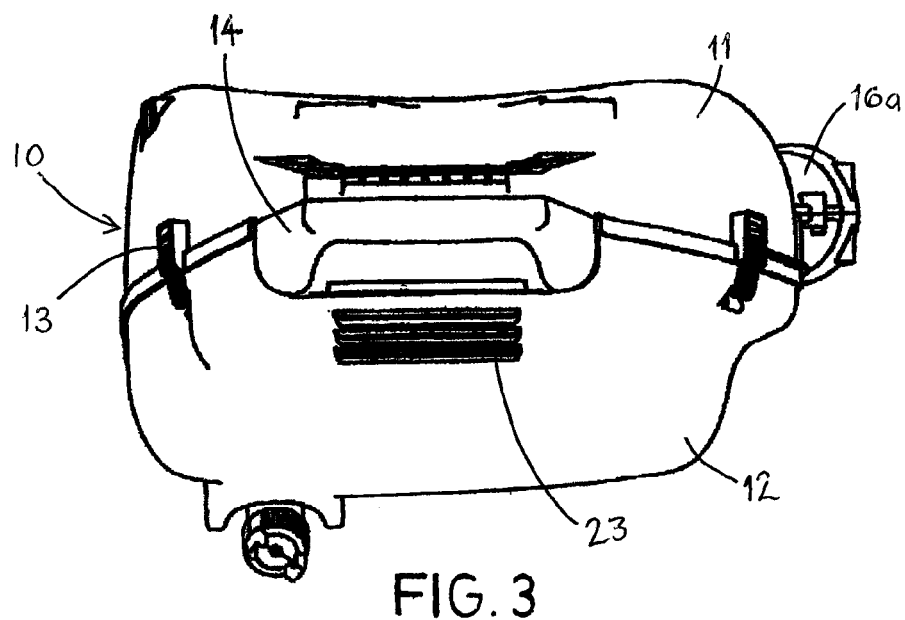
FIG. 3. Shows the casing as seen from above.

The leaf blower is during normal use carried on the back of the operator. FIG. 3 illustrates the shape of bottom section 11 that is designed so that it is comfortable for the operator to carry on the back.

Figure 5:
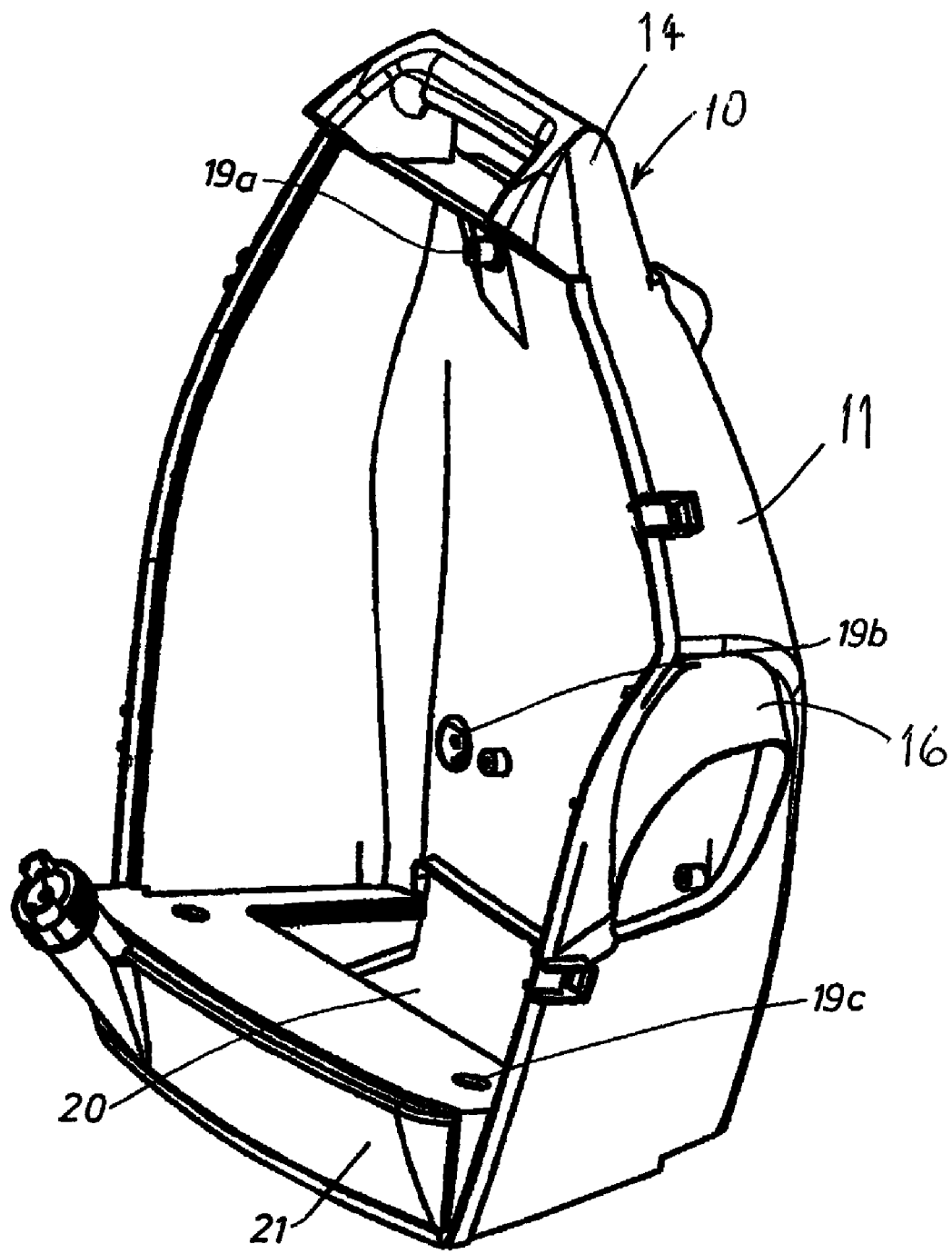
FIG. 5. Shows a perspective view of the section of the casing that is closest to the back of the operator during normal use of the leaf blower.

On the side of the casing 10 that is turned toward the back of the operator are straps (not shown) of the same type as the one used for rucksacks attached to the casing 10. As illustrated in FIG. 5, the bottom section 11 of the casing 10 is provided with two reinforced sections 17 to which the straps are attached. The straps are attached at one end to the first reinforced section 17 and at the other end to a second reinforced section 18. In order to reduce the load on the back of the operator, the leaf blower can be provided with a belt that also is attached to the second reinforced sections 18.

The bottom section 11 of the casing 10 is the supporting structure for the tool. The components are attached to the bottom section 11. The inside of the bottom section 11 is therefore provided with several fastening means 19a, 19b, 19c, to which the components are attached. A tank 21 for gasoline is placed on a lower part of the casing 10 in which the air inlet 20 is located. The tank 21 is placed outside the air inlet 20, which creates an effective sound wave trap that reduces the amount of sound waves that leave the casing through the air inlet 20.

The invention claimed is:

1. Casing (10) for a combustion engine powered tool that is carried on the back of the operator, wherein the casing (10) covers and supports all noise generating components in the tool, the casing (10) comprising:

an air inlet (20) comprising an opening in a lower part of the casing (10) for providing air from outside the air inlet (20) to the noise generating components inside the casing (10);

a gasoline tank (21) provided outside of the air inlet (20) and within the lower part of the casing (10), the tank (21) being arranged between the lower part and the air inlet (20) so that the tank (21) provides a sound wave trap that reduces the amount of sound waves that leave the casing (10) through the air inlet (20).

2. Casing (10) according to claim 1, wherein the casing (10) comprises two sections, a bottom section (11) and a lid (12).

3. Casing (10) according to claim 2, wherein the bottom section (11) provides the support for the components inside the casing (10).

4. Casing (10) according to claim 2 or 3, wherein straps and/or a belt for carrying of the tool are attached to the bottom section (11).

5. Casing (10) according to claim 2 or 3, wherein the casing (10) is made of a sound insulating and/or a bump and wear resistant material.

6. Casing according to claim 2 or 3, wherein the casing (10) has a handle (14) integrated in a top part of the casing (10).

7. Casing (10) according to claim 2 or 3, wherein the tool has a starting rope and a starting handle (22) placed a side of the casing.

8. Casing (10) for a combustion engine powered tool that is carried on the back of the operator, wherein the casing (10) covers all noise generating components in the tool and supports the components in the tool, the casing (10) comprising:

an air inlet (20) comprising an opening the casing (10) for providing air from outside the air inlet (20) to the noise generating components inside the casino (10); and a sound wave trap provided within the casing, the sound wave trap comprising a gasoline tank (21) being arranged outside the air inlet (20) between the casing (10) and the air inlet (20) to reduce the amount of sound waves that leave the casing (10) through the air inlet (20).

\* \* \* \* \*